UNITED STATES PATENT OFFICE.

ERNEST L. RANSOME, OF SAN FRANCISCO, CALIFORNIA.

IMPROVEMENT IN ARTIFICIAL STONE.

Specification forming part of Letters Patent No. 152,167, dated June 16, 1874; application filed January 24, 1874.

*To all whom it may concern:*

Be it known that I, ERNEST LESLIE RANSOME, of Great Britain, at present residing in the city and county of San Francisco and State of California, have invented and discovered new and useful Improved Process for Seasoning Artificial Stone; and I do hereby declare that the following is a full and exact description of the same.

My invention relates to an improved process for indurating and removing the excess of moisture from artificial stones by the aid of heat and moisture.

If the stone contains soluble silica, I first immerse it in a solution of silicate of soda or potash, or in a solution of any of the compound silicates. This solution may be heated previous to immersing the stones; or the stone may be placed in it when it is at an ordinary temperature, and the temperature increased by the application of heat until the desired temperature is obtained. The maximum temperature in ordinary cases should be about 212° Fahrenheit; but it may be increased to a much higher degree, if found necessary. As a rule the higher the temperature the better the results upon the stone. I therefore do not claim any particular degree of heat, nor any particular length of time during which the stone should be subjected to the action of the hot bath, these conditions depending upon the character of the stones, their composition and size. When the stone has been subjected a sufficient length of time to the action of this bath or heated solution, the liquid is withdrawn, or the stones are removed, and placed in a separate vessel, worm, or tank. I then surround the stones with an atmosphere of about their own temperature, which is moistened by steam, by an atomizer, or by any other means, the object being to obtain a greater quantity of moisture in the atmosphere surrounding the stone than would result from the conversion of the moisture in the stone to steam. After maintaining this moist atmosphere at a temperature long enough to convert the moisture in the stone to steam, I gradually reduce the amount of moisture while carefully regulating the temperature to prevent condensation in the stone until the stones have uniformly attained their normal shrinkage.

Artificial stone which does not contain soluble silica need not be subjected to the hot bath or silicate solution, but will be seasoned and indurated by being subjected to the moist atmosphere and subsequent dry heat.

By the above-described process the surface of the stone is speedily indurated, while heat and moisture are conveniently conveyed to the mass, and by the use of the atmospheric treatment the obnoxious surface cracks consequent upon variable shrinkage of the mass, and so frequently met with in artificial cement stones, are prevented.

Having thus described my invention, what I claim as new is—

The process of seasoning artificial stones, substantially as above described.

The above specification of my invention signed by me this 9th day of January, 1874.

ERNEST L. RANSOME.

Witnesses:
  I. G. CLARK,
  A. A. WISMORE.